United States Patent
Peng

(10) Patent No.: US 8,786,121 B1
(45) Date of Patent: Jul. 22, 2014

(54) WAVE-MAKING AND POWER-GENERATING SYSTEM

(71) Applicant: Sheng-Po Peng, Miaoli County (TW)

(72) Inventor: Sheng-Po Peng, Miaoli County (TW)

(*) Notice: Subject to any disclaimer, the term of this patent is extended or adjusted under 35 U.S.C. 154(b) by 0 days.

(21) Appl. No.: 13/760,162

(22) Filed: Feb. 6, 2013

(51) Int. Cl.
*F03B 13/22* (2006.01)
*F03B 13/18* (2006.01)
*F03B 17/04* (2006.01)

(52) U.S. Cl.
CPC .............. *F03B 13/1815* (2013.01); *F03B 17/04* (2013.01)
USPC .......................................................... 290/53

(58) Field of Classification Search
USPC ................................. 290/53; 4/491
See application file for complete search history.

(56) References Cited

U.S. PATENT DOCUMENTS

| | | | | |
|---|---|---|---|---|
| 3,287,967 | A | * | 11/1966 | Laurent .......................... 73/148 |
| 3,981,612 | A | * | 9/1976 | Bunger et al. .................. 416/66 |
| 4,705,428 | A | * | 11/1987 | Andersen ........................ 405/79 |
| 4,730,355 | A | * | 3/1988 | Kreinbihl et al. ................. 4/491 |
| 4,783,860 | A | * | 11/1988 | Funke et al. ...................... 4/491 |
| 5,320,449 | A | * | 6/1994 | Demarteau ..................... 405/79 |
| 6,019,547 | A | * | 2/2000 | Hill ................................. 405/79 |
| 8,267,047 | B2 | * | 9/2012 | Tunze .......................... 119/247 |
| 2006/0202483 | A1 | * | 9/2006 | Gonzalez ........................ 290/53 |
| 2010/0158611 | A1 | * | 6/2010 | Demarteau ..................... 405/79 |
| 2012/0255112 | A1 | * | 10/2012 | Osterman et al. ................. 4/491 |
| 2013/0207398 | A1 | * | 8/2013 | Jo ................................... 290/53 |

* cited by examiner

*Primary Examiner* — Michael Zarroli
(74) *Attorney, Agent, or Firm* — Jackson IPG PLLC

(57) ABSTRACT

A wave-making and power-generating system uses a motor reducer to move a wave-making drum up and down in a water reservoir via a rocker arm, causing a float to rotate a power generator for generating electricity by a transmission mechanism via an inertial wheel set. A small amount of electricity can move the wave-making drum to drive the power generator to generate electricity. Multiple floats can be used with a respective transmission mechanism and a respective inertial wheel set to drive one power generator.

10 Claims, 2 Drawing Sheets

WAVE-MAKING AND POWER-GENERATING SYSTEM

BACKGROUND OF THE INVENTION

1. Field of the Invention

The present invention relates to power generation technology and more particularly, to a wave-making and power-generating system, which utilizes a wave-making drum to move water in a water reservoir in making waves, forcing a float to rotate a power generator via a transmission mechanism and an inertial wheel set.

2. Description of the Related Art

Although nuclear power generator is an effective power generation source, there is always controversy surrounding nuclear waste disposal and nuclear power generation safety-related issues. Further, thermal power can provide electricity for the people's livelihood, however it is less in line with the principles of environmental protection and its cost is high. Further, wind powered and solar powered electricity generation plants are in line with the principles of environmental protection, however, their installation cost is high, and the level of wind and solar power generation is conditional upon the weather and time of day. As for hydroelectric power, the level of water reserved determines the hydroelectric effect. Further, hydroelectric power generation is also limited to dams, water sources, and thus the application of hydroelectric power generation has geographical restrictions. Therefore, it is desirable to provide a power generation system that does not cause pollution and does not produce waste, and is environmentally friendly and cost-effective.

SUMMARY OF THE INVENTION

The present invention has been accomplished under the circumstances in view. It is the main object of the present invention to provide a wave-making and power-generating system, which enables a motor reducer to drive a rocker arm to move a wave-making drum in a respective water reservoir in making water waves by providing a small amount of electricity to the motor reducer, forcing a float to drive a transmission mechanism and to further rotate a power generator via an inertia wheel set, and therefore the power generator can generate electricity efficiently.

It is another object of the present invention to provide a wave-making and power-generating system, which can be widely used in different places without space constraints, and is clearly in line with the principles of environmental protection because it does not produce pollution and waste, and because the water in the water reservoir is re-usable. Further, when compared to conventional solar powered and wind powered generators, the installation cost of the wave-making and power-generating system is much lower, and therefore the wave-making and power-generating system will become increasingly popular and widely used.

It is still another object of the present invention to provide a wave-making and power-generating system, which allows multiple floats to be used with respective transmission mechanisms and inertial wheel sets to drive one power generator, enhancing the efficiency of power generation.

DETAILED DESCRIPTION OF THE INVENTION

Figure 1:
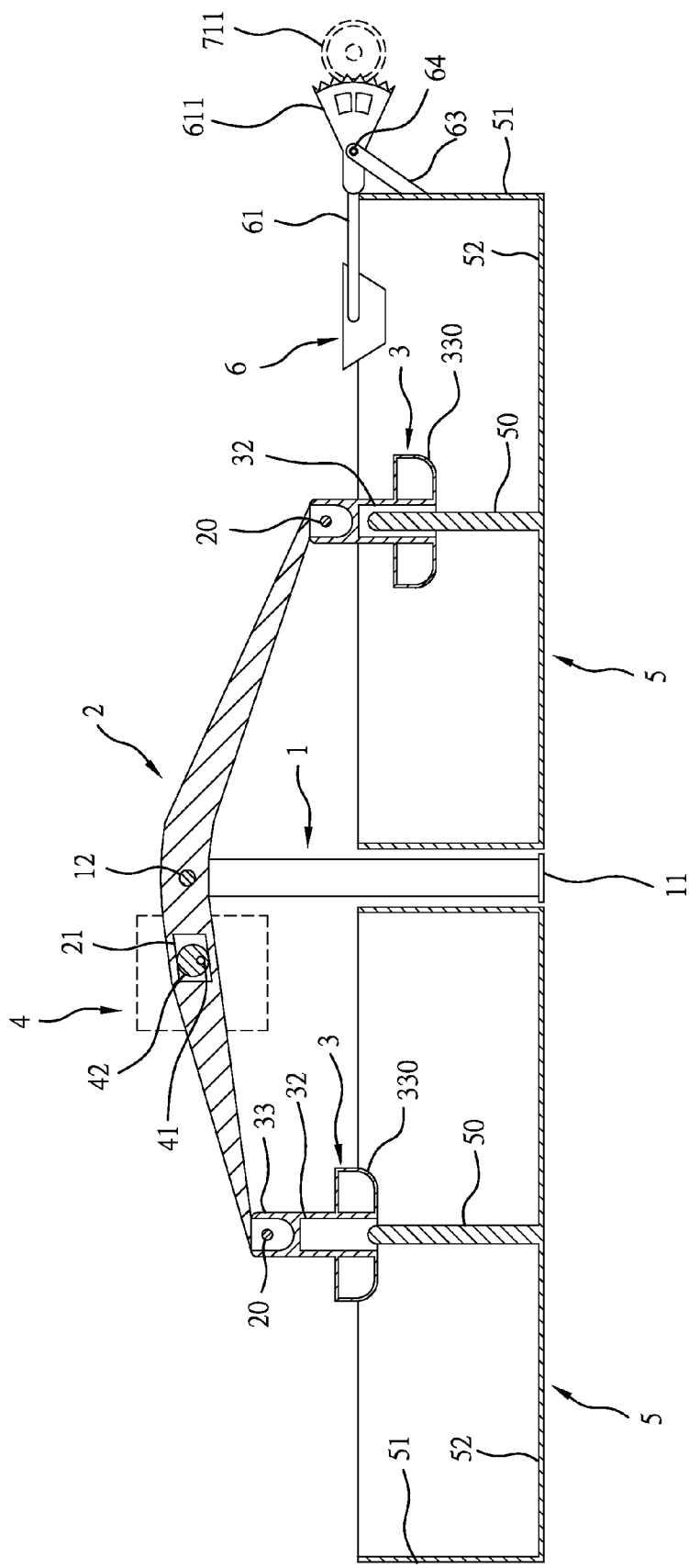
FIG. 1 is a schematic sectional view of a wave-making and power-generating system in accordance with the present invention.
Figure 2:
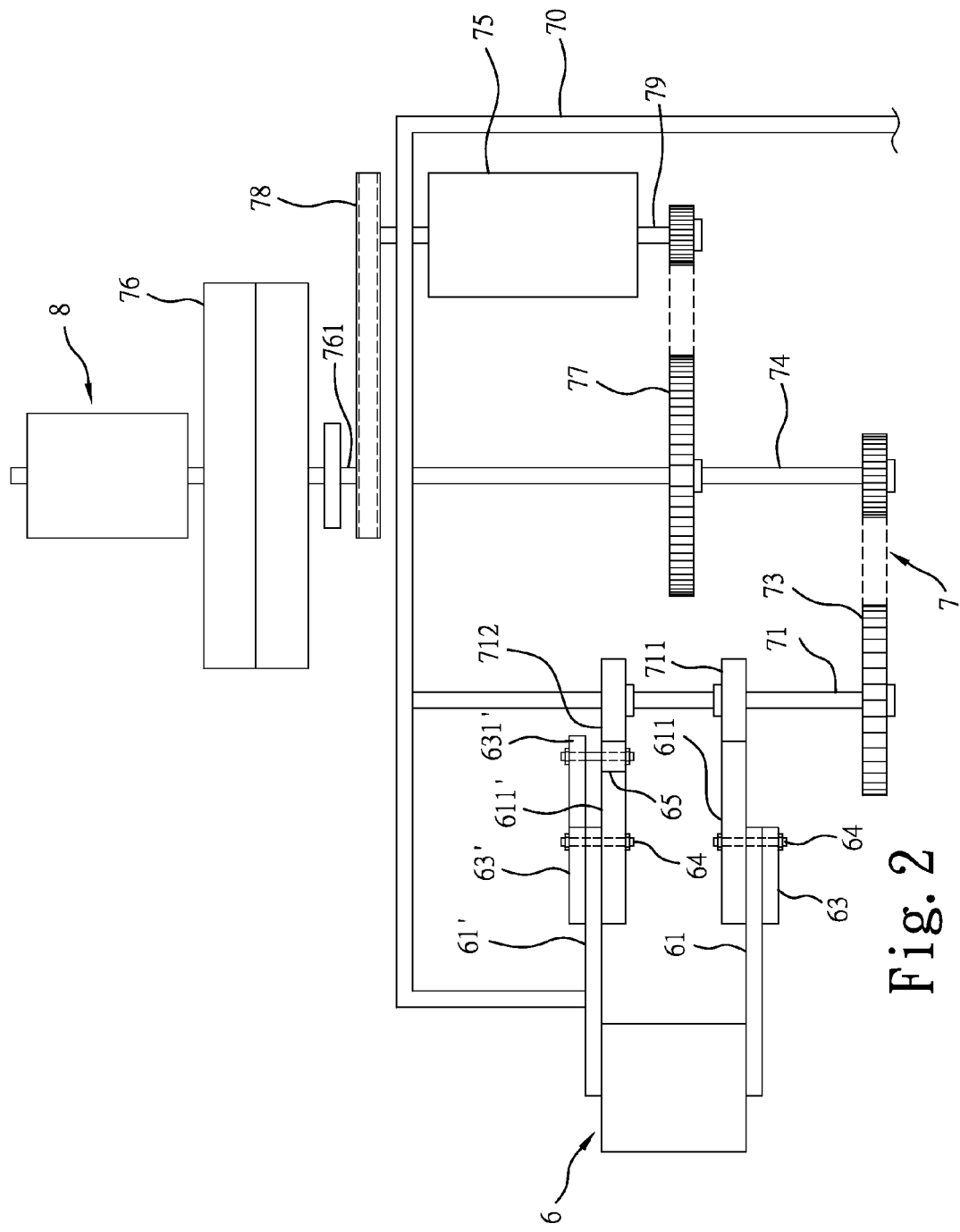
FIG. 2 is a schematic top view, in an enlarged scale, of a part of the present invention, illustrating the mounting arrangement between the transmission mechanism and the float.

Referring to FIGS. 1 and 2, a wave-making and power-generating system in accordance with the present invention is shown. The wave-making and power-generating system comprises:

a support frame 1 having a bottom side 11 thereof affixed to the floor or a suitable location of a building and a top side thereof provided with a pivot member 12;

a rocker arm 2 pivotally supported with the center thereof on the pivot member 12 of the support frame 1 and having coupling means, for example, a coupling hole 21 located in an eccentric position and coupled to a motor reducer 4 for enabling the rocker arm 2 to be alternatively turned back and forth about the pivot member 12 by the motor reducer 4;

at least one wave-making drum 3 each having a handle 33 located at a top side thereof and coupled to the rocker arm 2 and movable up and down by the rocker arm 2 to oscillate water in a water reservoir 5 in making waves;

a motor reducer 4 comprising an output shaft 41 and an eccentric wheel 42 located at a distal end of the output shaft 41 and coupled to the coupling hole 21 of the rocker arm 2 for turning the rocker arm 2 alternatively back and forth about the pivot member 12 of the support frame 1;

at least one, for example, two water reservoirs 5 respectively holding a proper amount of water;

a first support bar 63 and a second support bar 63' fixedly mounted at one sidewall 51 of one water reservoir 5 in a parallel manner, the second support bar 63' having an extension portion 631';

a follower gear 65 pivotally supported on the extension portion 631' of the second support bar 63' at one water reservoir 5;

a float 6 floating on the water in one water reservoir 5;

a first link 61 and a second link 61' coupled between the first support bar 63 and second support bar 63' at one water reservoir 5 and the two opposite lateral sides of the float 6 in the associating water reservoir 5;

a first gear wheel 611 and a second gear wheel 611' respectively pivotally coupled to the pivoted area between the first link 61 and the first support bar 63 and the pivoted area between the second link 61' and second the support bar 63' by a respective pivot 64 (see FIG. 2), the second gear wheel 611' being meshed with the follower gear 65;

a transmission mechanism 7 comprising a driven shaft 71, a first one-way ball-bearing ratchet wheel 711 mounted on the driven shaft 71 and meshed with the first gear wheel 611, a second one-way ball-bearing ratchet wheel 712 mounted on the driven shaft 71 and meshed with the follower gear 65, a transmission shaft 74, a first belt transmission device 73 coupled between the driven shaft 71 and the transmission shaft 74, a speed reducing gear 75 having an input shaft 79, a second belt transmission device 77 coupled between the transmission shaft 74 and the input shaft 79 of the speed reducing gear 75, an inertia wheel set 76 having a wheel shaft 761, and a chain transmission device 78 coupled between the speed reducing gear 75 and the inertia wheel set 76; and a power generator 8 coupled to the wheel shaft 761 of the inertia wheel set 76 and rotatable by the wheel shaft 761 of the inertia wheel set 76 to generate electricity.

Thus, during rotation of the motor reducer 4, the eccentric wheel 42 is driven by the output shaft 41 of the motor reducer 4 to swing the rocker arm 2, moving each connected wave-making drum 3 up and down in the water in the respective water reservoir 5 to make water waves. At this time, the float 6 is moved up and down in the respective water reservoir 5 to rotate the first gear wheel 611 and the second gear wheel 611' synchronously back and forth, causing the first one-way ball-bearing ratchet wheel 711 and the second one-way ball-bearing ratchet wheel 712 to rotate the driven shaft 71. During forward and backward rotation of the driven shaft 71, the first belt transmission device 73 is driven to rotate the transmission shaft 74, causing the second belt transmission device 77 to rotate the input shaft 79 of the speed reducing gear 75 and the chain transmission device 78 to rotate the inertia wheel set 76, and therefore the power generator 8 is driven by the inertia wheel set 76 to generate electricity.

Further, the handle 33 of each wave-making drum 3 is coupled to one end of the rocker arm 2 by a pivot member 20. Further, each wave-making drum 3 defines a coupling slot 32 coupled to an upright guide bar 50 in the respective water reservoir 5. Thus, each wave-making drum 3 can be moved smoothly up and down in the respective water reservoir 5 along the respective upright guide bar 50.

Further, the aforesaid transmission mechanism 7 is mounted in a bracket 70 that is affixed to the sidewall 51 or bottom wall 52 of one water reservoir 5, or a surrounding floor.

Further, the float 6 is made out of metal. When the wave-making drum 3 is moved by the rocker arm 2 up and down in the respective water reservoir 5 to make water waves, the float 6 can be lifted by the force of the water waves and buoyancy in water. When the water wave declines, the float 6 will also decline subject to the effect of its gravity weight.

Further, the water reservoir 5 can be selectively made of a high strength metal, high strength plastic or composite material, reinforced concrete or any other high strength material, in the form of a circular, rectangular or polygonal tank or water pool. The amount of water contained in the water reservoir 5 is preferably above ⅔ of the total storage capacity of the water reservoir 5.

Further, each wave-making drum 3 has a smoothly arched bottom peripheral edge 330, facilitating up and down movement of the wave-making drum 3 in the respective water reservoir 5 to make waves.

In conclusion, the wave-making and power-generating system has the advantages and features as follows:
1. Providing a small amount of electricity to the motor reducer 4 can drive the rocker arm 2 to move the wave-making drum 3 in the respective water reservoir 5 in making water waves, so that the float 6 can drive the transmission mechanism 7 to rotate the power generator 8 via the inertia wheel set 76, causing the power generator 8 to generate electricity efficiently.
2. The wave-making and power-generating system can be widely used in different places without space constraints, and is clearly in line with the principles of environmental protection because it does not produce pollution and waste, and because the water in the water reservoir is re-usable. Further, when compared to conventional solar powered and wind powered generators, the installation cost of the wave-making and power-generating system is much lower, and therefore the wave-making and power-generating system will become increasingly popular and widely used.
3. Multiple floats 6 can be used with respective transmission mechanisms 7 and inertial wheel sets 76 to drive one power generator 8, enhancing the efficiency of power generation.

What is claimed is:
1. A wave-making and power-generating system, comprising:
   a support frame having a bottom side thereof affixed to the floor or a suitable location of a building and a top side thereof provided with a pivot member;
   a rocker arm pivotally supported with the center thereof on the pivot member of said support frame, said rocker arm comprising coupling means located in an eccentric position;
   at least one water reservoir arranged around said support frame and respectively holding a predetermined amount of water, each said water reservoir comprising a first support bar and a second support bar fixedly mounted at an outer side of one sidewall thereof in a parallel manner, said second support bar comprising an extension portion;
   at least one wave-making drum floating on the water in said at least one water reservoir and movable up and down by said rocker arm to oscillate the water in said water reservoir in making waves, each said wave-making drum comprising a handle located at a top side thereof and coupled to said rocker arm;
   a motor reducer comprising an eccentric wheel located at a distal end of an output shaft thereof and coupled to said coupling means of said rocker arm for turning said rocker arm alternatively back and forth relative to said support frame;
   a follower gear pivotally supported on the extension portion of the second support bar of one said water reservoir;
   at least one float respectively floating on the water in said at least one water reservoir;
   a first link and a second link pivotally coupled between the first support bar and second support bar at each said water reservoir and two opposite lateral sides of one respective said float;
   a first gear wheel and a second gear wheel respectively pivotally coupled to the pivoted area between said first link and said first support bar and the pivoted area between said second link and said second the support bar by a respective pivot, said second gear wheel being meshed with said follower gear;
   at least one transmission mechanism, each said transmission mechanism comprising a driven shaft, a first one-way ball-bearing ratchet wheel mounted on said driven shaft and meshed with said first gear wheel, a second one-way ball-bearing ratchet wheel mounted on said driven shaft and meshed with said follower gear; and
   a power generator coupled to each said transmission mechanism and rotatable by each said transmission mechanism to generate electricity.

2. The wave-making and power-generating system as claimed in claim 1, wherein each said transmission mechanism further comprises a transmission shaft, a first belt transmission device coupled between said driven shaft and said transmission shaft, a speed reducing gear, said speed reducing gear comprising an input shaft, a second belt transmission device coupled between said transmission shaft and the input shaft of said speed reducing gear, an inertia wheel set, said inertial wheel set comprising a wheel shaft coupled to said power generator, and a chain transmission device coupled between said speed reducing gear and said inertia wheel set.

3. The wave-making and power-generating system as claimed in claim 1, wherein the handle of each said wave-making drum is coupled to one end of said rocker arm by a pivot member; each said water reservoir comprises an upright guide bar; each said wave-making drum defines a coupling slot slidably coupled to the upright guide bar in one said water reservoir.

4. The wave-making and power-generating system as claimed in claim 1, wherein each said transmission mechanism is mounted in a bracket that is affixed to a sidewall or bottom wall of one said water reservoir, or a surrounding floor.

5. The wave-making and power-generating system as claimed in claim 1, wherein each said float is made out of metal.

6. The wave-making and power-generating system as claimed in claim 1, wherein each said water reservoir is selectively made of a high strength metal, high strength plastic or composite material, or a reinforced concrete.

7. The wave-making and power-generating system as claimed in claim 1, wherein each said water reservoir is made in the form of a tank or water pool.

8. The wave-making and power-generating system as claimed in claim 1, wherein the amount of water contained in each said water reservoir is preferably above ⅔ of the total storage capacity of the respective said water reservoir.

9. The wave-making and power-generating system as claimed in claim 1, wherein said coupling means of said rocker arm is a coupling hole.

10. The wave-making and power-generating system as claimed in claim 1, wherein each said wave-making drum has a smoothly arched bottom peripheral edge.

* * * * *